R. L. CAIRNCROSS.
BAIL HOLDER FOR LANTERNS.
APPLICATION FILED JUNE 24, 1911.
1,013,530.
Patented Jan. 2, 1912.
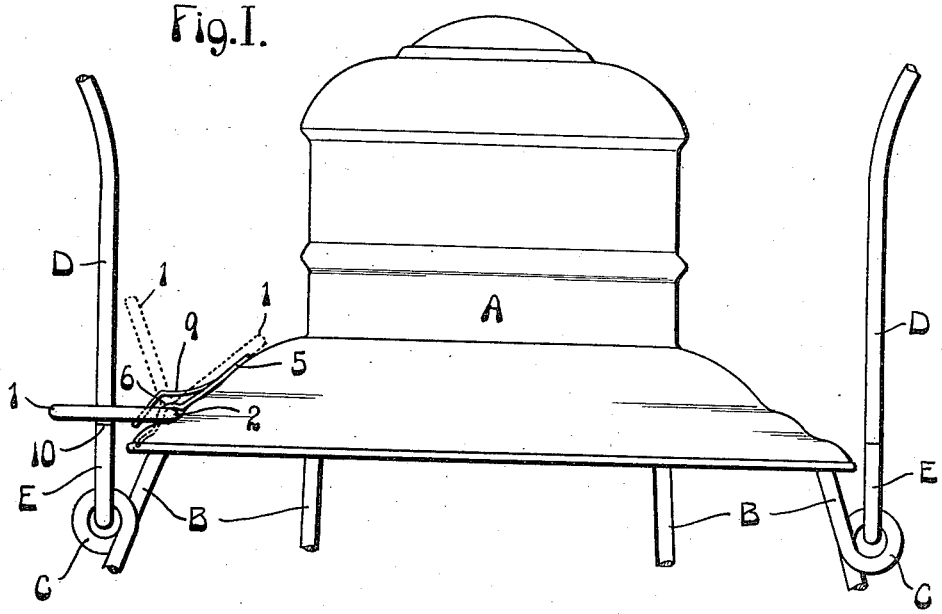
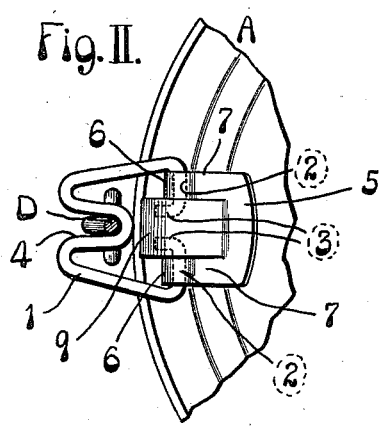
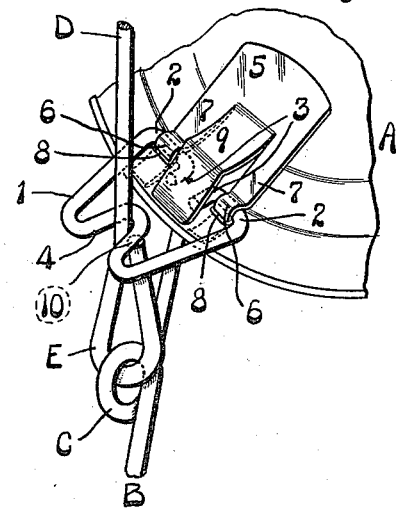
Attest
A. J. McCauley
E. B. Finn
Inventor:
R. L. Cairncross
by Knight & Cook
Att'ys.

UNITED STATES PATENT OFFICE.

ROBERT L. CAIRNCROSS, OF CHICAGO, ILLINOIS, ASSIGNOR TO A. H. HANDLAN, JR., OF ST. LOUIS, MISSOURI.

BAIL-HOLDER FOR LANTERNS.

1,013,530.  Specification of Letters Patent.  Patented Jan. 2, 1912.

Application filed June 24, 1911. Serial No. 635,058.

*To all whom it may concern:*

Be it known that I, ROBERT L. CAIRNCROSS, a citizen of the United States of America, residing in the city of Chicago, in the county of Cook and State of Illinois, have invented certain new and useful Improvements in Bail-Holders for Lanterns, of which the following is a full, clear, and exact description, reference being had to the accompanying drawings, forming a part of this specification.

My invention relates to a bail holder for lanterns, and has for its object the production of a very simple holder adapted to be moved into engagement with the lantern bail to prevent said bail from swinging independently of the lantern, the improvement including a spring pressure device by which the bail is automatically locked in positions to which it is adjusted.

Figure I is a side elevation of a top portion of a lantern equipped with a bail holder embodying the features of my invention. Fig. II is a top or plan view of the bail holder, the bail being shown in cross section. Fig. III is a perspective view of the parts shown in Fig. II.

In the accompanying drawings:—A designates the hood of a lantern, and B designates guard wires, two of which are provided with eyes C for the reception of a bail D. The ends of the bail are bent to form the usual loops E which occupy the eyes C.

A latch 1, adapted to be moved into and out of engagement with the bail D, is formed of a single piece of wire bent into W-shape having inturned bends and returned ends so as to produce pivot arms 2, fingers 3 extending at an angle from said pivot arms and a bifurcated or forked bail engaging middle portion 4.

5 designates a clip plate, soldered or otherwise suitably secured to the hood A, and fitted to said hood so as to provide bearings 6 for the pivot arms 2. The clip plate 5 is slit so as to produce legs 7 which pass through slots 8 in the hood A and extend under the hood and an unbent spring tongue 9 extending from the clip plate 5 between its legs 7 which bears against the latch fingers 3 so as to hold the latch 1 engaged with the bail, or to hold said latch out of engagement with the bail as shown by dotted lines in Fig. I.

When the latch 1 is engaged with the bail, it is forced against the upturned end 10 of a bail loop E by the spring tongue 9 which, by pressing on the fingers 3, tends to swing the latch downwardly. When the latch is disengaged from the bail, the spring tongue 9 by pressing on the fingers 3, holds said latch elevated in either of the positions shown by dotted lines in Fig. I.

I claim:—

1. A lantern comprising a body, a bail pivoted to said body, a bail latch pivoted to said body and having a finger carried by and extending laterally from its pivot member, and a spring tongue carried by said body engaging said finger to hold the latch from movement when the latter is in engagement with said bail.

2. A lantern comprising a body including a hood, a bail pivoted to said body, a latch adapted to be moved into and out of engagement with said bail, the latch including a pivot member having a finger extending laterally from said member, a clip secured to said hood and having legs in which the pivot member of said latch is operable, and a spring tongue associated with said clip located intermediate of the legs of the clip and engaging the finger carried by the pivot member of the latch to hold it from movement when it is in engagement with said bail.

3. A lantern comprising a bail, a pivoted latch of W-shape having pivot arms and fingers and adapted to be moved into and out of engagement with said bail, a clip fitted to the lantern to form a pivot bearing for the pivot arms of said latch, and a spring tongue extending from said clip and bearing against the fingers of said latch to hold the latter in engagement with said bail.

4. A lantern comprising a bail, a latch adapted to be moved into and out of engagement with said bail, said latch consisting of a wire loop of W-shape for engaging the bail having pivot arms and fingers and a clip fitted to the lantern to form a pivot bearing for the pivot arms of said wire loop, and having a spring tongue bearing on the fingers of said loop to hold the latter in engagement with said bail.

5. A lantern comprising a bail, a latch adapted to be moved into and out of engagement with said bail, said latch consisting of a wire loop of W-shape bent to form pivot arms and fingers extending from said pivot arms, and a clip fitted to said pivot arms, said clip having a spring tongue bearing against said fingers to hold said latch in engagement with or disengaged from said bail.

ROBERT L. CAIRNCROSS.

In the presence of—
M. SCOTT,
G. L. TOALE.

Copies of this patent may be obtained for five cents each, by addressing the "Commissioner of Patents, Washington, D. C."